(12) United States Patent
Wu et al.

(10) Patent No.: US 12,181,586 B2
(45) Date of Patent: Dec. 31, 2024

(54) SYSTEM AND METHOD FOR MULTI-TRACK ENVIRONMENTAL FAULT MONITORING FOR AERIAL PLATFORMS

(71) Applicant: Raytheon Company, Waltham, MA (US)

(72) Inventors: Shuwu Wu, Yorba Linda, CA (US); Matt Keti, Alta Loma, CA (US); Andrew J. Thomas, Claremont, CA (US); Joseph Chang, Irvine, CA (US)

(73) Assignee: Raytheon Company, Tewksbury, MA (US)

( * ) Notice: Subject to any disclaimer, the term of this patent is extended or adjusted under 35 U.S.C. 154(b) by 423 days.

(21) Appl. No.: 17/662,536

(22) Filed: May 9, 2022

(65) Prior Publication Data

US 2023/0358895 A1 Nov. 9, 2023

(51) Int. Cl.
*G01S 19/20* (2010.01)
*G01S 19/39* (2010.01)

(52) U.S. Cl.
CPC ............ *G01S 19/20* (2013.01); *G01S 19/393* (2019.08); *G01S 19/396* (2019.08)

(58) Field of Classification Search
CPC ....... G01S 19/20; G01S 19/396; G01S 19/393
USPC .............................. 342/357.77, 352; 701/472
See application file for complete search history.

(56) References Cited

U.S. PATENT DOCUMENTS

| 7,089,452 | B2* | 8/2006 | Rubin ..................... G01S 19/08 |
| | | | 701/472 |
| 7,253,768 | B2 | 8/2007 | van Diggelen et al. |
| 8,154,445 | B2* | 4/2012 | Maenpa .................. G01S 19/23 |
| | | | 342/357.77 |
| 8,165,807 | B2 | 4/2012 | Garin |
| 9,423,495 | B1* | 8/2016 | Chang ................. G01S 13/0218 |
| 10,324,194 | B2 | 6/2019 | Schüttpelz et al. |
| 11,228,469 | B1 | 1/2022 | Shpak |
| 2011/0050492 | A1 | 3/2011 | Um et al. |
| 2013/0069822 | A1 | 3/2013 | Wu et al. |
| 2014/0129126 | A1 | 5/2014 | Richardson et al. |
| 2015/0378025 | A1 | 12/2015 | Kim et al. |
| 2020/0124742 | A1 | 4/2020 | Tranchet |
| 2021/0199812 | A1 | 7/2021 | Cheng et al. |

OTHER PUBLICATIONS

Notice of Allowance dated Mar. 6, 2024 in connection with U.S. Appl. No. 17/716,876, 8 pages.

\* cited by examiner

*Primary Examiner* — Bo Fan (57) ABSTRACT

A method for multi-track environmental fault monitoring for aerial platforms includes estimating a normalized squared residual error (NSRE) for each of one or more satellite-receiver tracks over time. The method also includes determining an averaged NSRE for each satellite-receiver track by averaging the NSRE over multiple time windows. The method further includes performing a threshold test on the averaged NSRE to determine a filter state. In addition, the method includes determining whether to apply a scale factor for each satellite-receiver track based on the filter state.

20 Claims, 7 Drawing Sheets

SYSTEM AND METHOD FOR MULTI-TRACK ENVIRONMENTAL FAULT MONITORING FOR AERIAL PLATFORMS

TECHNICAL FIELD

This disclosure is directed in general to navigation systems. More specifically, this disclosure relates to a system and method for multi-track environmental fault monitoring for aerial platforms.

BACKGROUND

The use of the Global Positioning System (GPS) or other Global Navigation Satellite System (GNSS) for safety-critical, high-availability air navigation missions can be challenging due to the potential presence of increased multipath caused by blockage. Multipath occurs when GNSS satellite signals reflect off different surfaces before reaching the GNSS receiver. Since GNSS positioning is based on the relative timing between when the signal was sent from the satellite to when it was received by the receiver, signals that travel indirect routes to the receiver result in additional time spent to get to the receiver, which ultimately manifests as positioning error.

SUMMARY

This disclosure provides embodiments of a system and method for multi-track environmental fault monitoring for aerial platforms.

In a first embodiment, a method includes estimating a normalized squared residual error (NSRE) for each of one or more satellite-receiver tracks over time. The method also includes determining an averaged NSRE for each satellite-receiver track by averaging the NSRE over multiple time windows. The method further includes performing a threshold test on the averaged NSRE to determine a filter state. In addition, the method includes determining whether to apply a scale factor for each satellite-receiver track based on the filter state threshold test.

In a second embodiment, a device includes at least one processor configured to estimate a NSRE for each of one or more satellite-receiver tracks over time. The at least one processor is also configured to determine an averaged NSRE for each satellite-receiver track by averaging the NSRE over multiple time windows. The at least one processor is further configured to perform a threshold test on the averaged NSRE to determine a filter state. In addition, the at least one processor is configured to determine whether to apply a scale factor for each satellite-receiver track based on the filter state threshold test.

In a third embodiment, a non-transitory computer readable medium contains instructions that when executed cause at least one processor to estimate a NSRE for each of one or more satellite-receiver tracks over time. The medium also contains instructions that when executed cause the at least one processor to determine an averaged NSRE for each satellite-receiver track by averaging the NSRE over multiple time windows. The medium further contains instructions that when executed cause the at least one processor to perform a threshold test on the averaged NSRE to determine a filter state. In addition, the medium includes instructions that when executed cause the at least one processor to determine whether to apply a scale factor for each satellite-receiver track based on the filter state threshold test.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 5, described below, and the various embodiments used to describe the principles of the present disclosure in this patent document are by way of illustration only and should not be construed in any way to limit the scope of the disclosure. Those skilled in the art will understand that the principles of the present disclosure may be implemented in any type of suitably arranged device or system.

For simplicity and clarity, some features and components are not explicitly shown in every figure, including those illustrated in connection with other figures. It will be understood that all features illustrated in the figures may be employed in any of the embodiments described. Omission of a feature or component from a particular figure is for purposes of simplicity and clarity and is not meant to imply that the feature or component cannot be employed in the embodiments described in connection with that figure. It will be understood that embodiments of this disclosure may include any one, more than one, or all of the features described here. Also, embodiments of this disclosure may additionally or alternatively include other features not listed here.

As discussed above, the use of GPS or GNSS for safety-critical, high-availability air navigation missions can be challenging due to the potential presence of increased multipath caused by blockage. Multipath occurs when GNSS satellite signals reflect off different surfaces before reaching the GNSS receiver. Since GNSS positioning is based on the relative timing between when the signal was sent from the satellite to when it was received by the receiver, signals that travel indirect routes to the receiver result in additional time spent to get to the receiver, which ultimately manifests as positioning error.

Blockage induced multipath error occurs when blockage on the receiver's direct line of sight to a satellite prevents the receiver from receiving signals directly; instead, some or all signals from the satellite are received indirectly through multipath. Such blockages can occur through obstacles such as the aircraft's wings and tail. This type of fault poses a significant threat to integrity and sigma bounding, causes safety concerns to precision navigation and landing, and must be properly mitigated. Without such mitigation, the risk of using Hazardously Misleading Information (HMI) in the position solution may be elevated, causing a threat to navigational safety and integrity. Mitigation is especially important during the automatic landing phase of flight, where clearances and tolerances are low, and chances for responding to unexpected events are limited. Vertical Integrity Alert Limits (VAL) for a land-based CAT-III or equivalent automatic landing are as low as ~4.0 meters for landing, 10 meters at one-half nautical mile for CAT-I Precision Approach (PA), 20 meters for APV-II, 35 meters for LPV 200, and 50 meters for LPV/APV-I.

This disclosure provides embodiments of a system and method for multi-track environmental fault monitoring for aerial platforms. Among other things, the disclosed embodiments mitigate the integrity threat caused by excessive airborne blockage induced multipath error, thereby maintaining integrity and navigation safety. In some embodiments, the disclosed systems and methods can be used for a number of commercial or defense-related applications, such as commercial or defense-related helicopters, drones, or other aerial vehicles. While not specifically listed here, any other suitable applications are within the scope of this disclosure.

Figure 1:
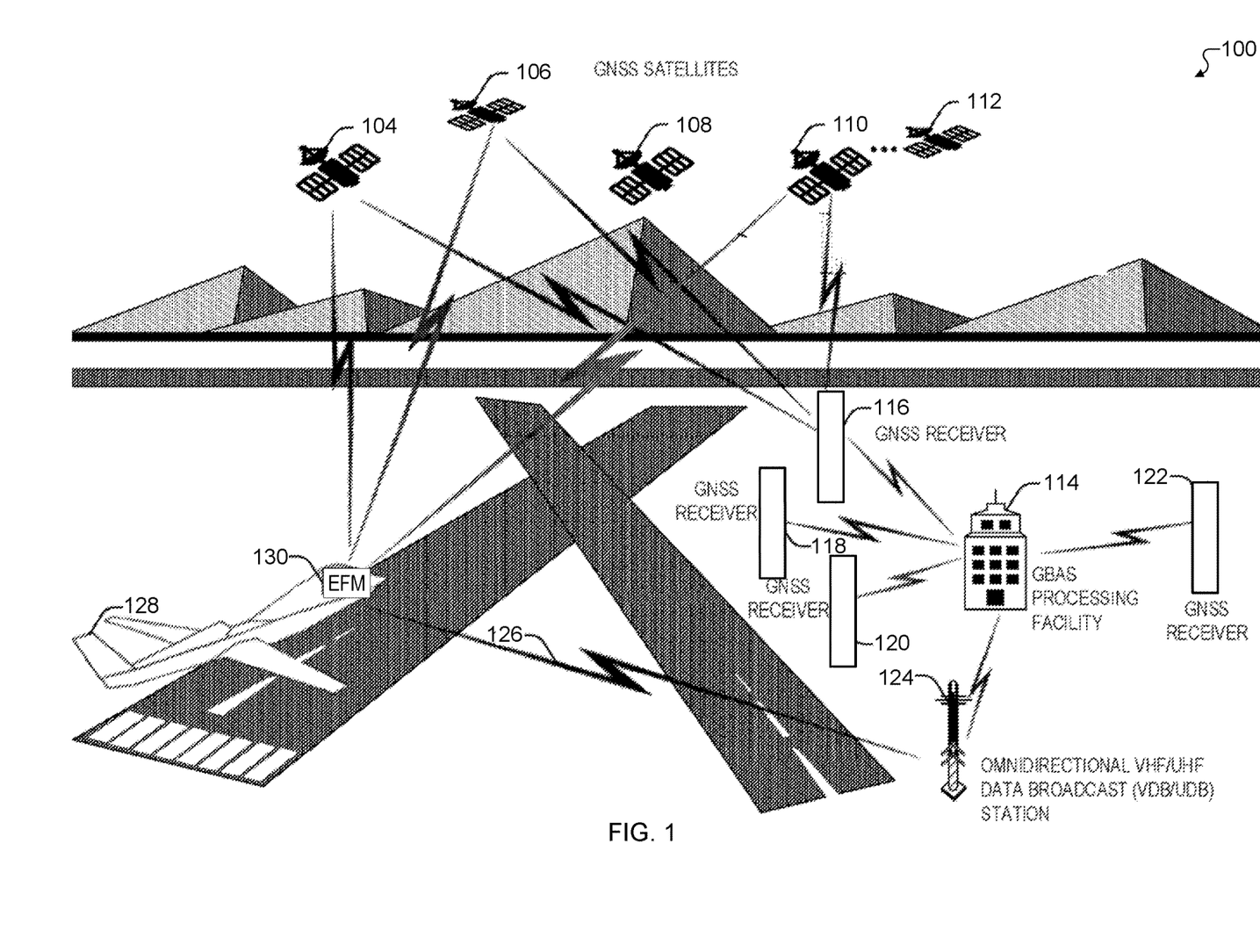
FIG. 1 illustrates an example system for processing geospatial positioning data according to this disclosure.

FIG. 1 illustrates an example system 100 for processing geospatial positioning data according to this disclosure. In some embodiments, the system 100 can include or be part of a Local Area Augmentation System (LAAS), a Ground Based Augmentation System (GBAS), or a sea-based Precision Approach and Landing System (PALS). However, the system 100 can include or be a part of any other suitable system(s). As shown in FIG. 1, the system 100 includes a plurality of GNSS receivers 116-122, which may be located in an area around an airport or another suitable location. The GNSS receivers 116-122 are configured to receive geospatial positioning data from GNSS satellites 104-112, which are configured to generate or otherwise provide geospatial positioning data.

The GNSS receivers 116-122 send measurements to a processing facility 114, which uses these measurements to formulate differential corrections and error bounds for the GNSS satellites 104-112, which are tracked by the GNSS receivers 116-122. Each of the GNSS receivers 116-122 may be precisely surveyed, enabling the processing facility 114 to determine errors in geospatial positioning signals being received from the GNSS satellites 104-112 by the GNSS receivers 116-122. Satellite and receiver measurements can be monitored for potential faults, and measurements with detected faults can be removed from the differential corrections. The processing facility 114 transmits these differential corrections, error bounds, ranging measurements, and other approach guidance information to a rover, such as an aircraft 128, via any suitable technique. In some cases, the information can be transmitted using a VHF Data Broadcast (VDB) or UHF Data Broadcast (UDB) 126 transmitted by a VDB/UDB station 124.

In some embodiments, the aircraft 128 can include an environmental fault monitor (EFM) 130. The EFM 130 is a type of integrity monitor provided for detecting and mitigating integrity threats to maintaining end-to-end navigation safety. In some embodiments, the EFM 130 can be a part of or include the airborne sigma monitor, which is responsible for ensuring the overbound of the modeled sigma for the receiver pseudorange code noise, carrier phase, and multipath measurement errors. The values of these modeled sigmas are based on an integrity allocation such that integrity is maintained by default. The sigma monitor ensures that significantly faulted receivers or receivers with significant potential for causing HMI are detected within the exposure time used to determine the a priori fault probability that the integrity allocation is based on. Lesser receiver faults are also detected (that only impose a minor increased probability of HMI), but have a longer exposure time.

As discussed in greater detail below, the EFM 130 uses squared differences between essential observables to detect tracks that have inflated error levels. By modelling the error as a sum of Gaussian and Gauss-Markov processes, the EFM 130 uses novel threshold equations that indicate when the squared differences are larger than expected, thus triggering scale factor generation. Short term averaging time windows allow a fast response time to the onset of a fault event, which then transitions to a long term time window that provides an estimate that is more sensitive to subtle errors.

The EFM 130 is capable of mitigating blockage induced excessive multipath error across all satellites, including blockage induced per-track multipath error. Per-track monitoring is more sensitive and responds faster to the onset of a fault event than a traditional spatial bin approach. In some embodiments, the EFM 130 can be configured to operate with platforms having different numbers of GNSS receivers 116-122. For example, the EFM 130 can operate with platforms having a single GNSS receiver 116-122, or with platforms having two or more GNSS receivers 116-122. In some embodiments, the EFM 130 uses time difference to enable environmental fault monitoring with a single GNSS receiver 116-122.

The EFM 130 considers excessive multipath errors that can occur on a GNSS receiver 116-122. For example, excessive multipath can be caused by blockages from external obstacles located around the receiver. The EFM 130 is able to deweight some faulty measurements, if the measurement degradation is not too severe, such that these degraded measurements are still used in the final navigation solution, instead of discarding them altogether. In some embodiments, the EFM 130 mitigates the blockages and maintains integrity by monitoring the multipath error and increasing the scale factor to ensure that the measurement error sigma overbounds, or if the error is extremely excessive, by excluding the single measurement. The EFM 130 includes any suitable hardware or hardware and firmware/software instructions to maintain integrity and protect a navigation system against environmental faults.

Although FIG. 1 illustrates one example of a system 100 for processing geospatial positioning data, various changes may be made to FIG. 1. For example, the system 100 may include any number of satellites 104-112 or GNSS receivers 116-122. Also, various components in the system 100 may be combined, further subdivided, replicated, rearranged, or omitted and additional components may be added according to particular needs. In addition, while FIG. 1 illustrates one example operational environment in which geospatial positioning data can be processed, this functionality may be used in any other suitable system.

Figure 2:
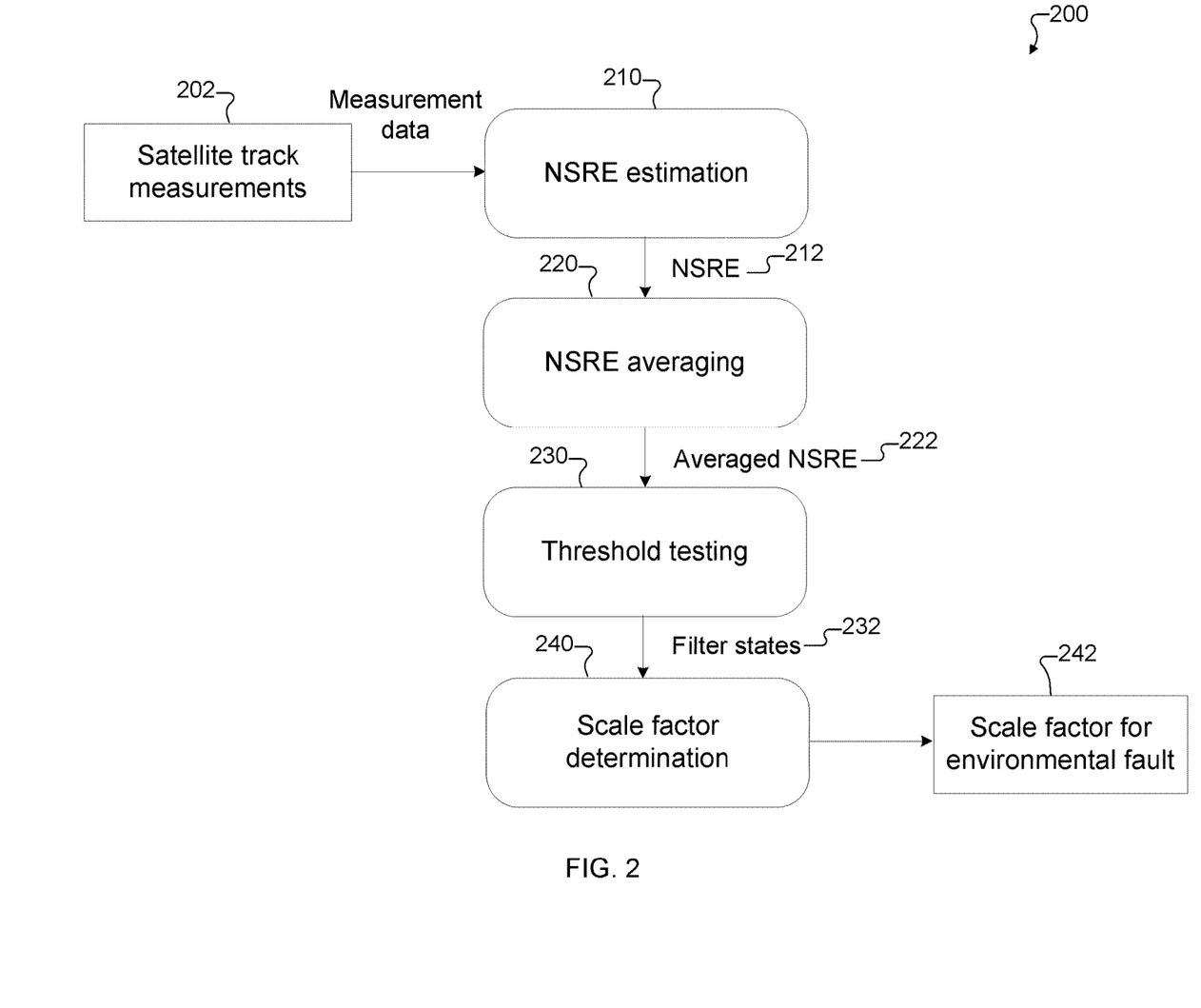
FIG. 2 illustrates an example process for multi-track environmental fault monitoring for aerial platforms according to this disclosure.

FIG. 2 illustrates an example process 200 for multi-track environmental fault monitoring for aerial platforms according to this disclosure. For ease of explanation, the process 200 is described as being performed using the EFM 130 in the system 100 of FIG. 1. However, the process 200 may involve the use of any suitable device(s) in any suitable system(s).

Using the process 200, the EFM 130 can detect and mitigate blockage induced excessive divergence free smoothed pseudorange error in the aircraft for each individual GNSS receiver 116-122. The EFM 130 looks for satellite tracks on each GNSS receiver 116-122 encountering increased noise or multipath due to environmental conditions, e.g., blockages. The EFM 130 then applies a scale factor greater than one to the sigma to ensure high integrity in the final navigation solution. There are two variants of the process 200: one for air platforms with a single GNSS receiver 116-122, and another for air platforms with two or more GNSS receivers 116-122. The variants differ in that, for the single receiver, the EFM 130 estimates the excessive multipath error through a time difference in measurements, while for two or more receivers, the EFM 130 estimates the excessive multipath error through a single difference between two GNSS receivers 116-122. This is described in greater detail below.

As shown in FIG. 2, both variants of the process 200 share multiple common operations. First, at step 210, the EFM 130 uses satellite track measurements 202 obtained over time to estimate a normalized squared residual error (NSRE) 212. This operation is described in greater detail below for each of the two EFM variants. At step 220, the EFM 130 performs NSRE averaging, in which the NSRE 212 is passed through several window averaging filters in parallel, which are used to find the averaged NSRE 222 over defined sample time windows (sample time=$\tau_w$). At step 230, the EFM 130 performs a threshold test against the averaged NSRE 222 to determine one of the following filter states 232: no data, good, pass, degraded, and fail. At step 240, the EFM 130 uses the resulting filter state 232 from the threshold test to determine whether to apply a scale factor 242, and to determine the magnitude of the scale factor 242 to apply in order to maintain the ranging measurement error sigma bound if necessary.

In some embodiments, the EFM 130 can include flight dynamics screening, which places the window averaging filters on hold during periods of high flight dynamics that do not represent typical approach conditions. This mechanism is based on a screening flag that is generated at the input interface of the EFM 130 based on aircraft attitude and passed to the window averaging filters.

Step 210: NSRE Estimation

Figure 3A:
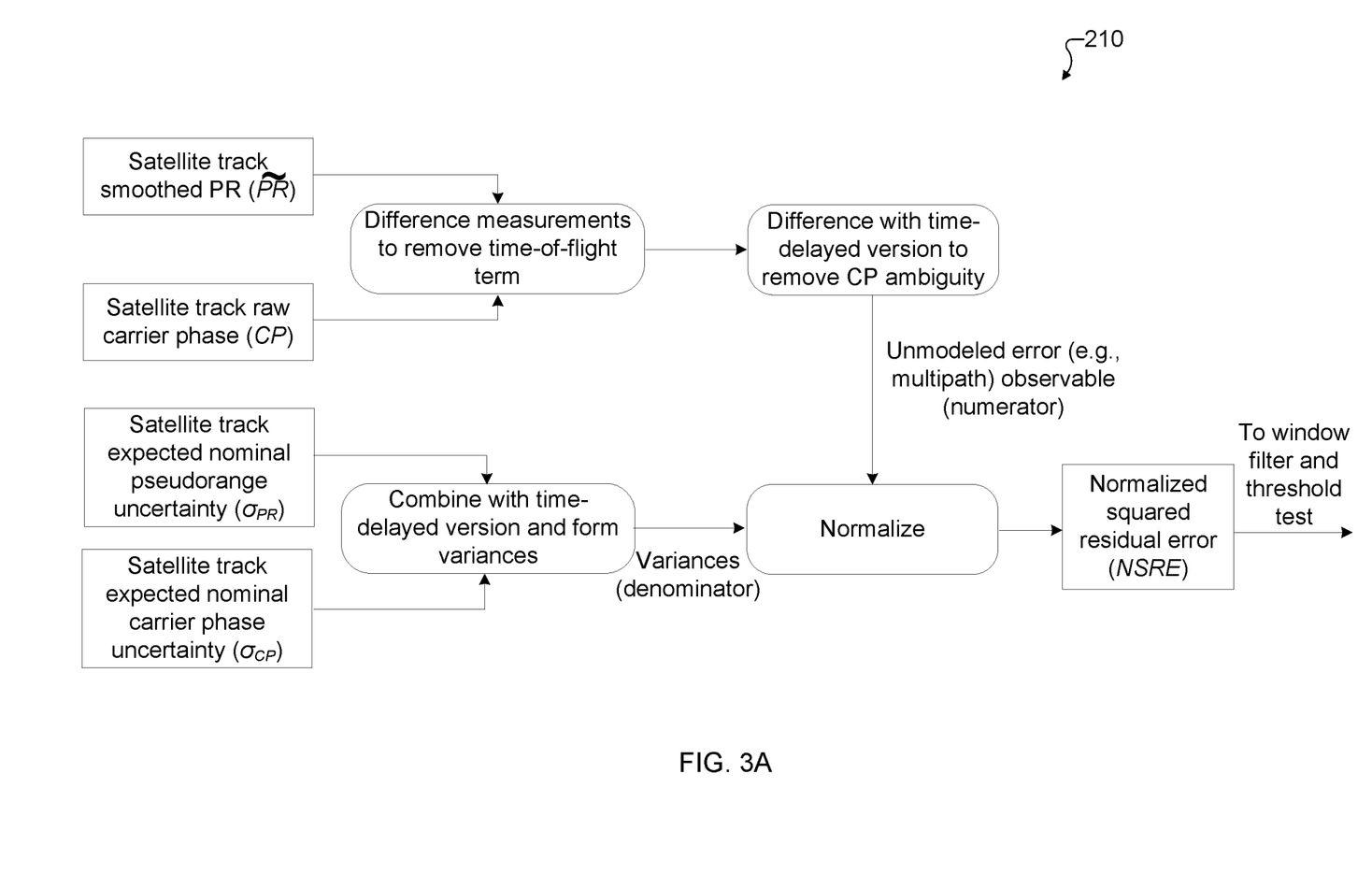
FIG. 3A illustrates a graphical representation of normalized squared residual error (NSRE) estimation in FIG. 2 for a single-receiver variant according to this disclosure.

For the single-receiver variant of the process 200, the EFM 130 first forms a multipath error observable by subtracting the divergence-free carrier phase from its corresponding pseudorange combination, e.g., L1 divergence free carrier phase and L1 pseudorange, or wide lane carrier phase and narrow lane pseudorange. Next, the difference is subtracted from its time-delayed version, forming the multipath error observable. The first difference cancels the time-of-flight term in the ranging measurement while keeping the phase ambiguity term. The time difference, while keeping the bulk of the pseudorange error (partial error cancellation can happen due to time correlation of measurement errors), removes the carrier phase ambiguity, forming a proper multipath error observable. This multipath error observable is then normalized by its associated nominal error sigma, leading to a normalized residual error (NRE). The NSRE 212 is the square of the NRE. In some embodiments, the NSRE 212 can be determined according to the following:

$$NSRE_k = \frac{[(PR_{k+d} - CP_{k+d}) - (PR_k - CP_k)]^2}{\sigma^2_{PR,k+d} - 2*\text{cov}(PR_{k+d}, PR_k) + \sigma^2_{PR,k} + \sigma^2_{CP,k+d} - 2*\text{cov}(CP_{k+d}, CP_k) + \sigma^2_{CP,k} - 2*\text{cov}(PR_{k+d} - PR_k, CP_{k+d} - CP_k)}$$

where PR is the pseudorange forming a divergence-free smoothing conjugate pair with CP; CP is the carrier phase, forming a divergence-free smoothing conjugate pair with PR; $\sigma_{PR}$ and $\sigma_{CP}$ are the PR and CP measurement sigmas, respectively; k is the current epoch index; and d is the time delay index offset. FIG. 3A illustrates a graphical representation of the NSRE estimation in step 210 for the single-receiver variant according to this disclosure.

As described previously, the NSRE 212 is the normalized squared residual error, which is an indicator of any excessive amount of error above its nominal behavior. Note that the carrier phase variances can be excluded in the normalizing denominator, which allows a slightly conservative overestimation of the NSRE 212. The pseudorange and carrier phase are divergence-free smoothing (DFS) conjugate pairs, for example narrow-lane pseudorange and wide-lane phase. The $\sigma_{PR}$ in this context refer to the corresponding DFS conjugate pseudorange sigma based on its thermal noise, multipath, and antenna bias error components, which are dependent on time and smoothing maturity.

Figure 3B:
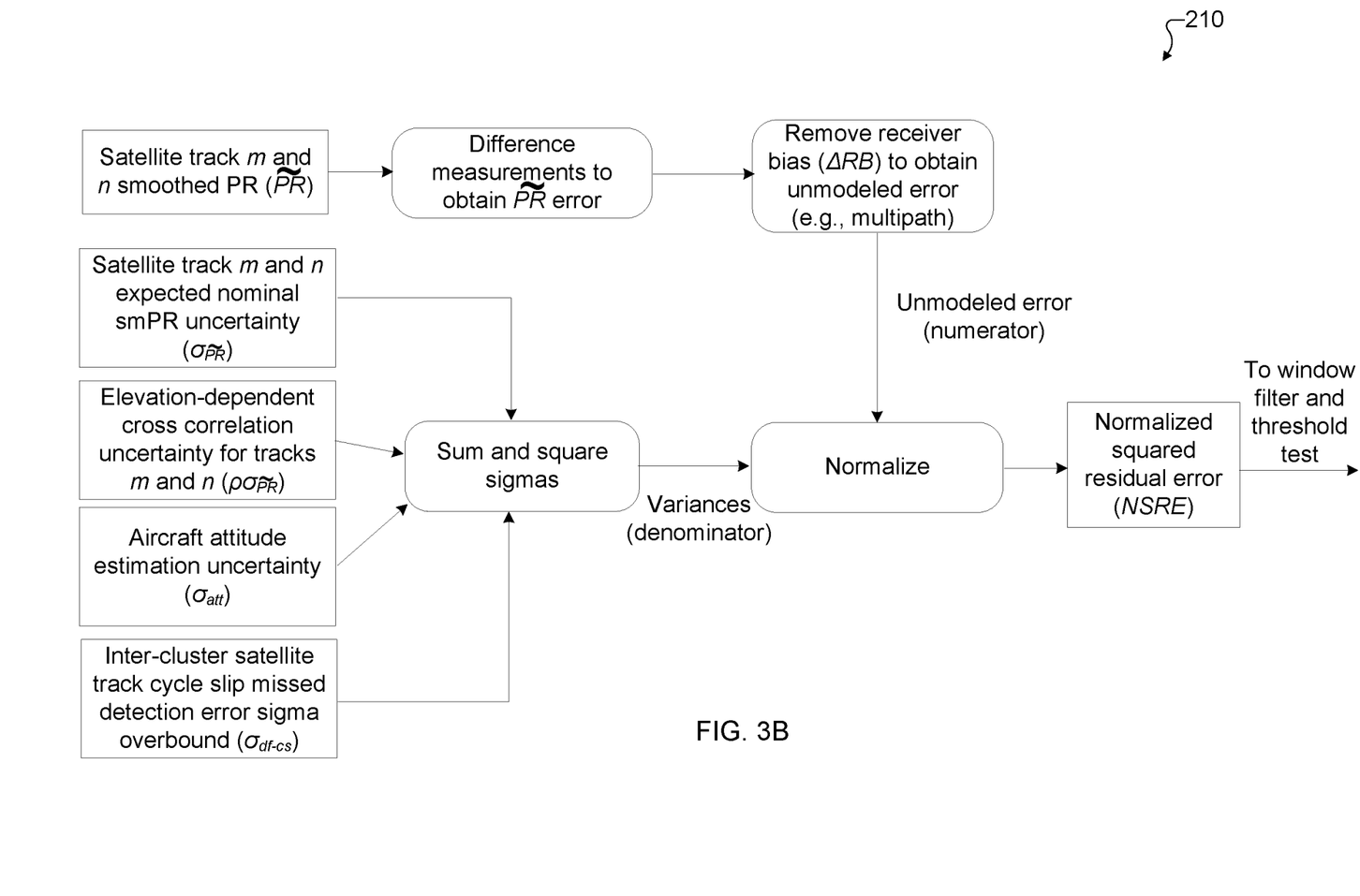
FIG. 3B illustrates a graphical representation of the NSRE estimation in FIG. 2 for a two-or-more-receiver variant according to this disclosure.

For the two-or-more-receiver variant of the process 200, the EFM 130 first extracts the smoothed pseudorange error by differencing the smoothed pseudorange between the receiver track pair for a given satellite. Next, the EFM 130 subtracts the receiver bias from the smoothed pseudorange error to ensure that only the unmodelled error remains. The denominator contains the expected nominal variance corresponding to the smoothed pseudorange observable in the numerator, in order to normalize it. A cross-correlation term accounts for the correlation between the two receiver tracks, multiplied by an elevation-dependent correlation coefficient. The cross-correlation between receiver tracks in different clusters, as well as cycle slip missed detection errors on the smoothed pseudorange, are also accounted for by their corresponding terms. For a receiver track pair m and n, and with frequencies y, using inputs from all satellites i in view, the NSRE 212 can be determined according to the following:

$$NSRE_{mn,y,i} = \frac{(\widetilde{PR}^i_{y,m} - \widetilde{PR}^i_{y,n} - \Delta RB_{y,mn})^2}{(\sigma^i_{\widetilde{PR},y,m})^2 - \rho\sigma^i_{\widetilde{PR},y,m}\sigma^i_{\widetilde{PR},y,n} + (\sigma^i_{\widetilde{PR},y,n})^2 + (\sigma^i_{att,mn})^2 + \min(\sigma^i_{df\_cs,m}, \sigma^i_{df\_cs,n})^2}$$

where $\widetilde{PR}$ is the smoothed pseudorange; $\Delta RB$ is the receiver clock bias, which is the frequency clock differential on y from receiver m to n estimated at time t; $\sigma_{\widetilde{PR}}$ is the smoothed pseudorange sigma; $\rho$ is an elevation-dependent correlation coefficient based on the average elevation of satellites m and n; $\sigma_{att}$ accounts for the aircraft attitude estimation error; $\sigma_{df\_cs}$ is the error sigma overbound of the smoothed pseudorange error due to cycle slip missed detection for a receiver track; mn is the receiver pair of interest; y is the frequency (e.g., L1/L2 for GPS measurements); and i is the satellite SVID (e.g., 1-32 for the GPS constellation) or set of active satellites. FIG. 3B illustrates a graphical representation of the NSRE estimation in step 210 for the two-or-more-receiver variant according to this disclosure.

Step 220: NSRE Averaging

After the NSRE 212 is calculated, the EFM 130 enters the window averaging filters that are used to find the averaged NSRE 222 over defined sample time windows, where the sample time=$\tau_w$. Several of these filters process in parallel, with each filter corresponding to a different sample time corresponding to long and short term time windows. In some embodiments, the filter weights the average according to the number of independent samples input and averages over time until $\tau_w$ is reached. The EFM 130 then smoothly transitions to a lag filter with a time constant equal to the sample window time. The outputs include the averaged NSRE 222 (also represented herein as $\overline{NSRE}$), the average number of samples used ($\overline{N}$), and the estimated number of independent samples over time (Nsamp) using the correlation time of the residuals.

Filter processing follows a standard window averaging filter to compute the averaged NSRE 222 based on different values of $\tau_w$. A typical implementation includes initialization logic that prevents corruption of the filter before data arrives, along with flight dynamics screening to place the filters on hold during periods of high dynamics that do not represent typical approach conditions. The filter is designed to run each epoch ($\Delta t$ seconds) with or without residual data input. Each satellite track (i.e., receiver/satellite pair) is treated independently in order to determine the problem track later in processing. Filter processing occurs frequency×windows×receivers×satellites number of times.

Step 230: Threshold Testing

Following filter processing, the EFM 130 performs the threshold test to determine the filter state 232. A typical implementation involves comparing each averaged NSRE 222 from the window filters to a series of increasing threshold values to assign the filter state 232 according to where the NSRE 222 falls in the series of threshold values. In some embodiments, the following conditions can apply:

No data: No data has been processed; this condition can occur during track initialization before data arrives.

Good: $\overline{NSRE} < th_{good}$, measurements are nominal and no excessive multipath errors have been detected. The Good condition can be used for hysteresis reasons (e.g., once a track is degraded, the average NSRE needs to fall below $th_{good}$ to be declared nominal again).

Pass: $th_{good} \leq \overline{NSRE} < th_{pass}$, measurements are nominal, and tolerable amounts of excessive multipath errors have been detected that do not require a scale factor 242.

Degraded: $th_{pass} \leq \overline{NSRE} < th_{fail}$, excessive multipath errors have been detected that require a scale factor 242 to maintain high integrity.

Fail: $\overline{NSRE} \geq th_{fail}$, multipath errors detected are extreme and the track should be excluded from being used in the navigation solution.

Figure 3C:
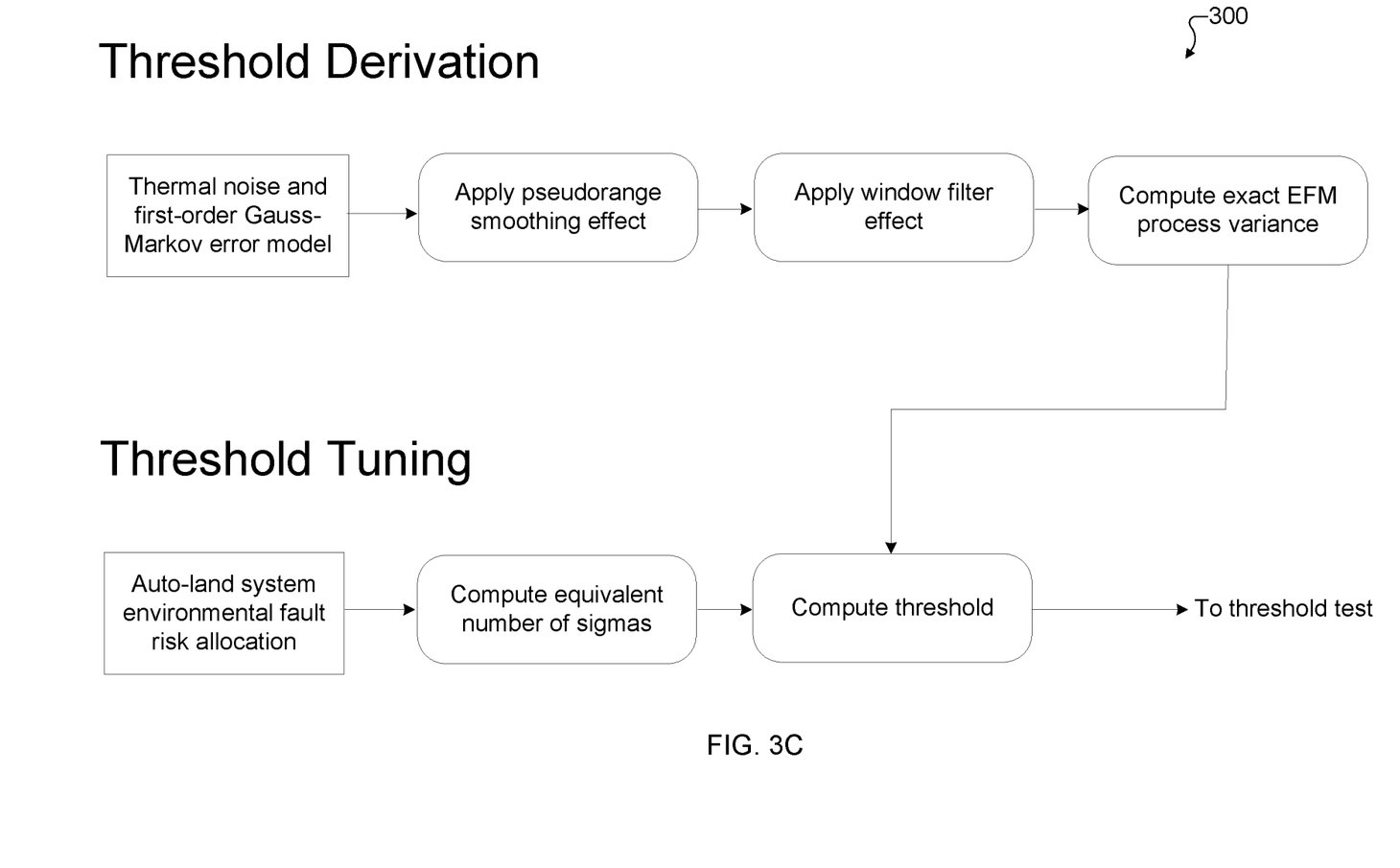
FIG. 3C illustrates an example process for derivation and tuning of thresholds used in threshold testing of FIG. 2 according to this disclosure.

The thresholds may be set based on $\overline{N}$ and Nsamp. The thresholds increase in magnitude in order of severity, thus $th_{good} < th_{pass} < th_{fail}$. In some embodiments, original equations based on the first-order Gauss-Markov error process are used to determine the thresholds. FIG. 3C illustrates an example process 300 for derivation and tuning of the thresholds used in the threshold testing of step 230 according to this disclosure.

After the threshold test but before the averaging filter states 232 are actually assigned, isolation and elimination logic is carried out for the two-or-more-receiver case. In some embodiments, the EFM 130 includes logic that attempts to determine the faulted track if possible, and remove it from (or inflate the measurement sigma for use in) the subsequent navigation solution. The EFM 130 can perform isolation logic first to determine the residual error statistics for the individual tracks from the pairwise receiver track errors. This can be achieved by setting up an over-determined set of equations, and solving the least squares problem for the averaged NSRE 222 for each track, given the averaged NSRE 222 of receiver track pair mn, and weighted based on the product of $\overline{N}$ and Nsamp. Note that the isolation logic is performed on measurements merged between individual frequencies (e.g., L1 and L2 for GPS measurements).

After performing isolation logic, the EFM 130 performs elimination logic to check the filter states 232 from the threshold test. In some embodiments, if the threshold tests result in degraded or failed filter states, then the receiver track with the worst error statistics is identified. Receiver tracks with failed filter states are removed, tracks with degraded filter states get a scale factor, and the rest of the pairs are put through this same process until all remaining receiver track pairs are good, or only two remain, in which both must be assumed to be degraded. The filter state 232 for an individual receiver track is the most conservative filter state that occurs among all receiver track pairs of which the GNSS receiver 116-122 is a member.

Step 240: Scale Factor Determination

The EFM 130 calculates the scale factor 242 to ensure that the error sigma inflated by the scale factor 242 conservatively overbounds the actual track measurement error. This is typically determined based on the filter states 232. Using the filter states 232, the EFM 130 sets the scale factor 242 (SF) to, for example:

SF=1 (no inflation) if there is no data in the filter;

$$SF = 1 \text{ or } SF = \sqrt{\overline{NSRE}},$$

whichever is less $$\left(\text{i.e., } SF = \min\left(1, \sqrt{\overline{NSRE}}\right)\right),$$

if the filter state 232 is better than degraded;

SF=1 or SF=K*$\overline{NSRE}$, where K is an adjustment factor based on continuity requirements, whichever is more (i.e., SF=max(1, K*$\overline{NSRE}$)), if the filter state 232 is degraded or worse. The real time scale factor inflation bounds any ranging measurement error with high integrity.

Although FIG. 2 illustrates one example of a process 200 for multi-track environmental fault monitoring for aerial platforms, various changes may be made to FIG. 2. For example, while shown as a series of steps, various steps in FIG. 2 may overlap, occur in parallel, occur in a different order, or occur any number of times.

Figure 4:
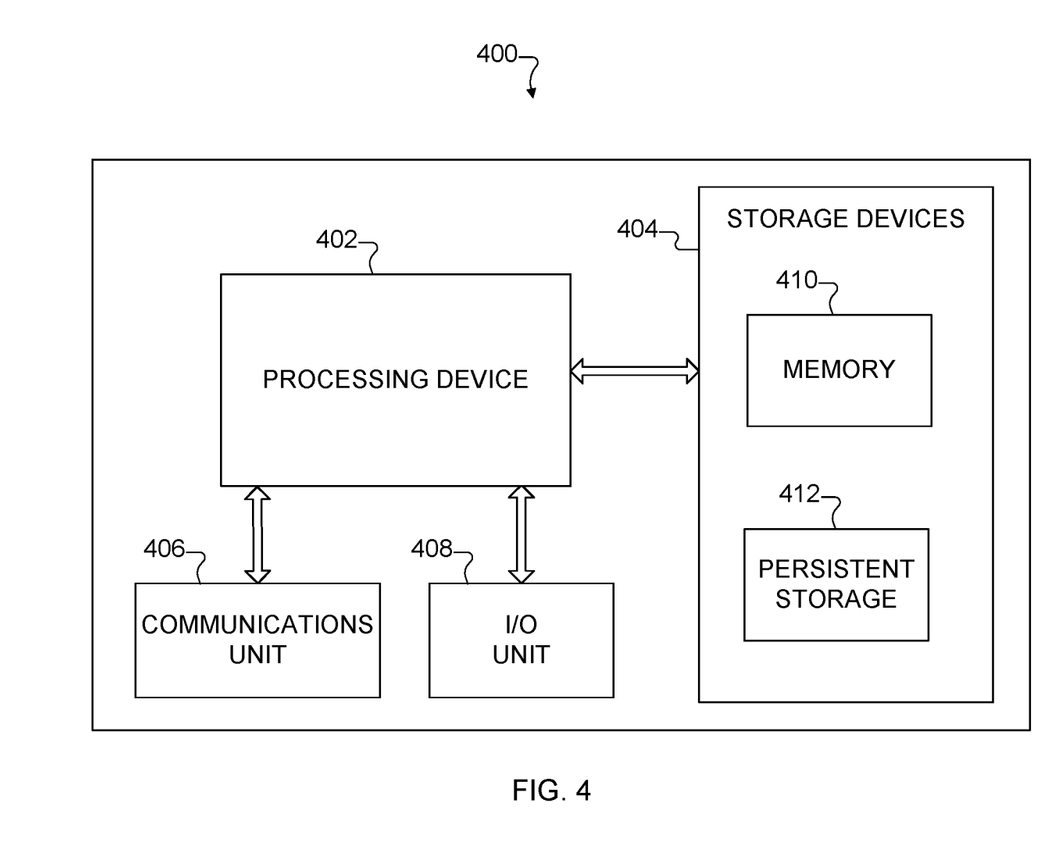
FIG. 4 illustrates an example device for multi-track environmental fault monitoring for aerial platforms according to this disclosure.

FIG. 4 illustrates an example device 400 for multi-track environmental fault monitoring for aerial platforms according to this disclosure. One or more instances of the device 400 may, for example, be used to at least partially implement the functionality of the EFM 130 of FIG. 1. However, the functionality of the EFM 130 may be implemented in any other suitable manner.

As shown in FIG. 4, the device 400 denotes a computing device or system that includes at least one processing device 402, at least one storage device 404, at least one communications unit 406, and at least one input/output (I/O) unit 408. The processing device 402 may execute instructions that can be loaded into a memory 410. The processing device 402 includes any suitable number(s) and type(s) of processors or other devices in any suitable arrangement. Example types of processing devices 402 include one or more microprocessors, microcontrollers, digital signal processors (DSPs), application specific integrated circuits (ASICs), field programmable gate arrays (FPGAs), or discrete circuitry.

The memory 410 and a persistent storage 412 are examples of storage devices 404, which represent any structure(s) capable of storing and facilitating retrieval of information (such as data, program code, and/or other suitable information on a temporary or permanent basis). The memory 410 may represent a random access memory or any other suitable volatile or non-volatile storage device(s). The persistent storage 412 may contain one or more components or devices supporting longer-term storage of data, such as a read only memory, hard drive, Flash memory, or optical disc.

The communications unit 406 supports communications with other systems or devices. For example, the communications unit 406 can include a network interface card or a wireless transceiver facilitating communications over a wired or wireless network. The communications unit 406 may support communications through any suitable physical or wireless communication link(s).

The I/O unit 408 allows for input and output of data. For example, the I/O unit 408 may provide a connection for user input through a keyboard, mouse, keypad, touchscreen, or other suitable input device. The I/O unit 408 may also send output to a display or other suitable output device. Note, however, that the I/O unit 408 may be omitted if the device 400 does not require local I/O, such as when the device 400 can be accessed remotely.

In some embodiments, the instructions executed by the processing device 402 can include instructions that implement the functionality of the EFM 130. For example, the instructions executed by the processing device 402 can include instructions for multi-track environmental fault monitoring for aerial platforms as described above.

Although FIG. 4 illustrates one example of a device 400 for multi-track environmental fault monitoring for aerial platforms, various changes may be made to FIG. 4. For example, computing devices and systems come in a wide variety of configurations, and FIG. 4 does not limit this disclosure to any particular computing device or system.

Figure 5:
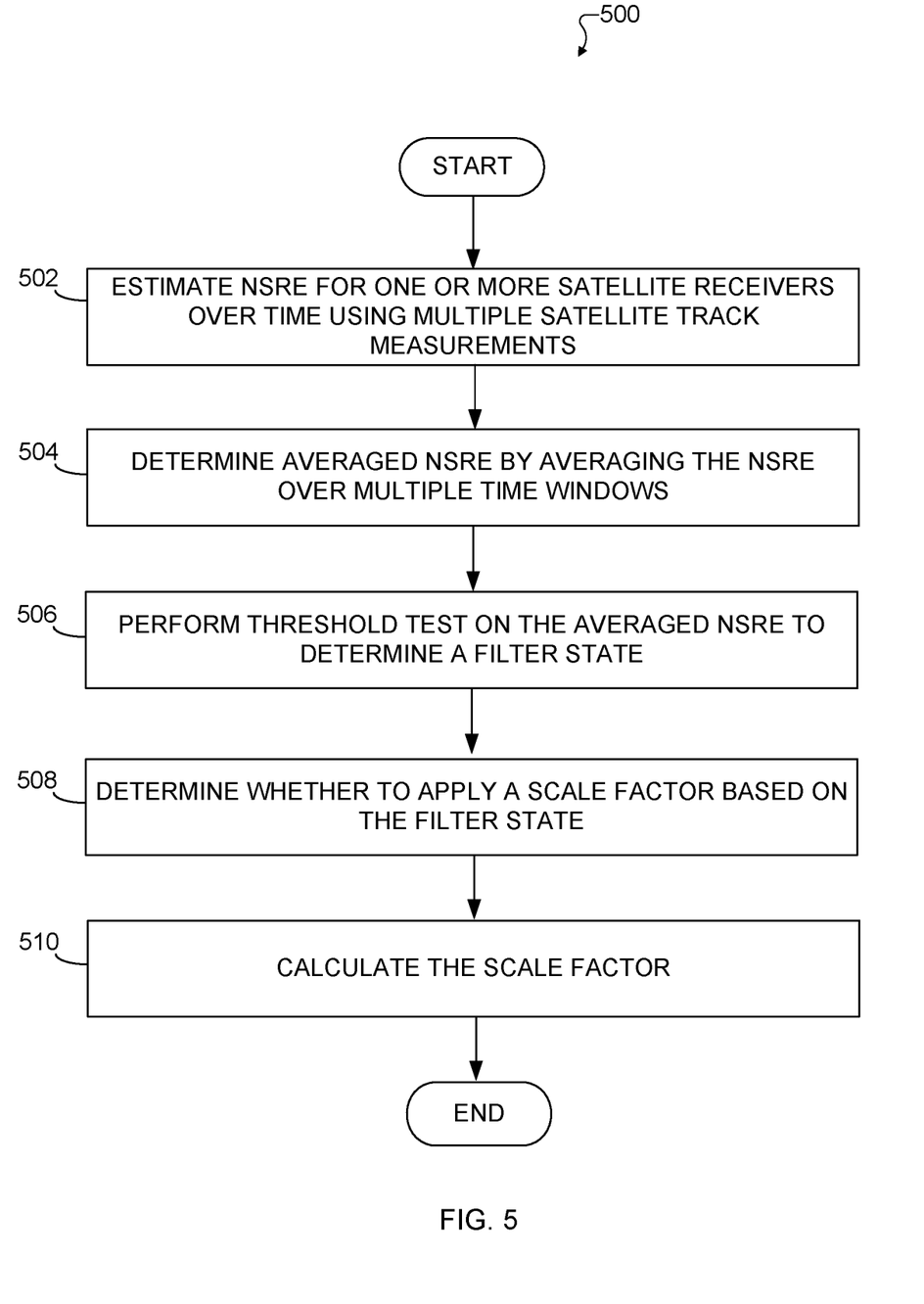
FIG. 5 illustrates an example method for multi-track environmental fault monitoring for aerial platforms according to this disclosure.

FIG. 5 illustrates an example method 500 for multi-track environmental fault monitoring for aerial platforms according to this disclosure. For ease of explanation, the method 500 is described as involving the process 200 of FIG. 2 and being performed using the EFM 130 in the system 100 of FIG. 1. However, the method 500 may be used with any other suitable device or system.

As shown in FIG. 5, a NSRE for each of one or more satellite receivers is estimated over time using multiple satellite track measurements at step 502. This may include, for example, the EFM 130 performing step 210 of FIG. 2 to estimate the NSRE 212 for one or more GNSS receivers 116-122 over time using multiple satellite track measurements 202. An averaged NSRE for each satellite-receiver track is determined at step 504 by averaging the NSRE over multiple time windows. This may include, for example, the EFM 130 performing step 220 of FIG. 2 to determine the averaged NSRE 222 by averaging the NSRE 212 over multiple time windows.

A threshold test is performed on the averaged NSRE to determine a filter state at step 506. This may include, for example, the EFM 130 performing step 230 of FIG. 2 on the averaged NSRE 222 to determine a filter state 232. It is determined whether to apply a scale factor for each satellite-receiver track based on the filter state at step 508. This may include, for example, the EFM 130 performing step 240 of FIG. 2 to determine whether to apply a scale factor 242 based on the filter state 232. The scale factor is calculated at step 510. This may include, for example, the EFM 130 performing step 240 of FIG. 2 to calculate the scale factor 242.

Although FIG. 5 illustrates one example of a method 500 for multi-track environmental fault monitoring for aerial platforms, various changes may be made to FIG. 5. For example, while shown as a series of steps, various steps shown in FIG. 5 may overlap, occur in parallel, occur in a different order, or occur multiple times. Also, some steps may be combined or removed and additional steps may be added according to particular needs.

As discussed herein, the EFM 130 addresses one of the four major integrity failure modes (i.e., receiver faults, ephemeris faults, severe ionospheric gradients, and environmental faults) in sea-based approach and landing systems, land-based (fixed site or mobile) approach and landing of Unmanned Aerial Vehicles (UAVs), or civil CAT-III operations. The EFM 130 can also address a major failure mode for land-based approach and landing systems when operating a base station remote from runways.

The EFM 130 can be implemented in a wide range of applications, including but not limited to, landing an aircraft (e.g., a jet, helicopter, UAVs, and the like) on a moving platform (e.g., an aircraft carrier, an LH amphibious ship, an oil drilling platform, and the like); precision approach and landing for manned aircraft and drones at vertiports; fixed site or expeditionary/tactical approach and landing systems; foreign military GBAS; and civil GBAS automatic landing operations (CAT-III).

The following describes example embodiments of this disclosure that implement or relate to multi-track environmental fault monitoring for aerial platforms. However, other embodiments may be used in accordance with the teachings of this disclosure.

In a first embodiment, a method includes estimating a NSRE for one or more satellite receivers over time using multiple satellite track measurements. The method also includes determining an averaged NSRE by averaging the NSRE over multiple time windows. The method further includes performing a threshold test on the averaged NSRE to determine a filter state. In addition, the method includes determining whether to apply a scale factor based on the filter state.

In a second embodiment, a device includes at least one processor configured to estimate a NSRE for one or more satellite receivers over time using multiple satellite track measurements. The at least one processor is also configured to determine an averaged NSRE by averaging the NSRE over multiple time windows. The at least one processor is further configured to perform a threshold test on the averaged NSRE to determine a filter state. In addition, the at least one processor is configured to determine whether to apply a scale factor based on the filter state.

In a third embodiment, a non-transitory computer readable medium contains instructions that when executed cause at least one processor to estimate a NSRE for one or more satellite receivers over time using multiple satellite track measurements. The medium also contains instructions that when executed cause the at least one processor to determine an averaged NSRE by averaging the NSRE over multiple time windows. The medium further contains instructions that when executed cause the at least one processor to perform a threshold test on the averaged NSRE to determine a filter state. In addition, the medium includes instructions that when executed cause the at least one processor to determine whether to apply a scale factor based on the filter state.

Any single one or any suitable combination of the following features may be used with the first, second, or third embodiment. The scale factor may be calculated after determining to apply the scale factor. Estimating the NSRE for one satellite receiver may include forming a multipath error observable by subtracting a divergence-free carrier phase from its corresponding pseudorange combination, e.g., L1 divergence free carrier phase and L1 pseudorange, or wide lane carrier phase and narrow lane pseudorange to form a difference and subtracting the difference from a time-delayed version; normalizing the multipath error observable by an associated nominal error sigma to form a normalized residual error (NRE); and estimating the NSRE as a square of the NRE. Estimating the NSRE for multiple satellite receivers may include determining a smoothed pseudorange error by differencing a smoothed pseudorange between a receiver track pair for a given satellite; and subtracting a receiver bias from the smoothed pseudorange error. Determining the averaged NSRE may include using multiple window averaging filters to determine the averaged NSRE. Each of the window averaging filters may correspond to a different time window. Performing the threshold test on the averaged NSRE to determine the filter state may include comparing the averaged NSRE to a series of increasing threshold values; and selecting the filter state based on where the averaged NSRE falls in the series of increasing threshold values. The filter state may be selected from a group consisting of: no data, good, pass, degraded, and fail.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   estimating a normalized squared residual error (NSRE) for each of one or more satellite-receiver tracks over time;
   determining an averaged NSRE for each satellite-receiver track by averaging the NSRE over multiple time windows;
   performing a threshold test on the averaged NSRE to determine a filter state; and
   determining whether to apply a scale factor for each satellite-receiver track based on the filter state.

2. The method of claim 1, further comprising:
   calculating the scale factor after determining to apply the scale factor; and
   applying the scale factor to an error sigma to ensure high integrity in a navigation solution.

3. The method of claim 1, wherein estimating the NSRE for one satellite-receiver track comprises:
   forming a multipath error observable by subtracting a divergence-free pair of measurements to form a difference and subtracting the difference from a time-delayed version;
   normalizing the multipath error observable by an associated nominal error sigma to form a normalized residual error (NRE); and
   estimating the NSRE as a square of the NRE.

4. The method of claim 1, wherein estimating the NSRE for multiple satellite-receiver tracks comprises:
   determining a smoothed pseudorange error by differencing a smoothed pseudorange between a receiver track pair for a given satellite;
   subtracting a receiver bias from the smoothed pseudorange error;
   normalizing the smoothed pseudorange error observable by an associated nominal error sigma to form a normalized residual error (NRE); and
   estimating the NSRE as a square of the NRE.

5. The method of claim 1, wherein:
  determining the averaged NSRE comprises using multiple window averaging filters to determine the averaged NSRE; and
  each of the window averaging filters corresponds to a different time window.

6. The method of claim 1, wherein performing the threshold test on the averaged NSRE to determine the filter state comprises:
  comparing the averaged NSRE to a series of increasing threshold values; and
  selecting the filter state based on where the averaged NSRE falls in the series of increasing threshold values.

7. The method of claim 6, wherein the filter state is selected from a predetermined group of filter states.

8. The method of claim 1, wherein real time scale factor inflation bounds a ranging measurement error with high integrity.

9. A device comprising:
  at least one processor configured to:
    estimate a normalized squared residual error (NSRE) for each of one or more satellite-receiver tracks over time;
    determine an averaged NSRE for each satellite-receiver track by averaging the NSRE over multiple time windows;
    perform a threshold test on the averaged NSRE to determine a filter state; and
    determine whether to apply a scale factor for each satellite-receiver track based on the filter state.

10. The device of claim 9, wherein the at least one processor is further configured to:
  calculate the scale factor after determining to apply the scale factor; and
  apply the scale factor to an error sigma to ensure high integrity in a navigation solution.

11. The device of claim 9, wherein, to estimate the NSRE for one satellite-receiver track, the at least one processor is configured to:
  form a multipath error observable by subtracting a divergence-free pair of measurements to form a difference and subtracting the difference from a time-delayed version;
  normalize the multipath error observable by an associated nominal error sigma to form a normalized residual error (NRE); and
  estimate the NSRE as a square of the NRE.

12. The device of claim 9, wherein, to estimate the NSRE for multiple satellite-receiver tracks, the at least one processor is configured to:
  determine a smoothed pseudorange error by differencing a smoothed pseudorange between a receiver track pair for a given satellite;
  subtract a receiver bias from the smoothed pseudorange error;
  normalize the smoothed pseudorange error observable by an associated nominal error sigma to form a normalized residual error (NRE); and
  estimate the NSRE as a square of the NRE.

13. The device of claim 9, wherein:
  to determine the averaged NSRE, the at least one processor is configured to use multiple window averaging filters to determine the averaged NSRE; and
  each of the window averaging filters corresponds to a different time window.

14. The device of claim 9, wherein, to perform the threshold test on the averaged NSRE to determine the filter state, the at least one processor is configured to:
  compare the averaged NSRE to a series of increasing threshold values; and
  select the filter state based on where the averaged NSRE falls in the series of increasing threshold values.

15. The device of claim 14, wherein the at least one processor is configured to select the filter state from a predetermined group of filter states.

16. A non-transitory computer readable medium containing instructions that when executed cause at least one processor to:
  estimate a normalized squared residual error (NSRE) for each of one or more satellite-receiver tracks over time;
  determine an averaged NSRE for each satellite-receiver track by averaging the NSRE over multiple time windows;
  perform a threshold test on the averaged NSRE to determine a filter state; and
  determine whether to apply a scale factor for each satellite-receiver track based on the filter state.

17. The non-transitory computer readable medium of claim 16, wherein the instructions when executed further cause the at least one processor to:
  calculate the scale factor after determining to apply the scale factor; and
  apply the scale factor to an error sigma to ensure high integrity in a navigation solution.

18. The non-transitory computer readable medium of claim 16, wherein the instructions that when executed cause the at least one processor to estimate the NSRE for one satellite-receiver track comprise instructions that when executed cause the at least one processor to:
  form a multipath error observable by subtracting a divergence-free pair of measurements to form a difference and subtracting the difference from a time-delayed version;
  normalize the multipath error observable by an associated nominal error sigma to form a normalized residual error (NRE); and
  estimate the NSRE as a square of the NRE.

19. The non-transitory computer readable medium of claim 16, wherein the instructions that when executed cause the at least one processor to estimate the NSRE for multiple satellite-receiver tracks comprise instructions that when executed cause the at least one processor to:
  determine a smoothed pseudorange error by differencing a smoothed pseudorange between a receiver track pair for a given satellite;
  subtract a receiver bias from the smoothed pseudorange error;
  normalize the smoothed pseudorange error observable by an associated nominal error sigma to form a normalized residual error (NRE); and
  estimate the NSRE as a square of the NRE.

20. The non-transitory computer readable medium of claim 16, wherein:
  the instructions that when executed cause the at least one processor to determine the averaged NSRE comprise instructions that when executed cause the at least one processor to use multiple window averaging filters to determine the averaged NSRE; and
  each of the window averaging filters corresponds to a different time window.

* * * * *